United States Patent [19]
Keich et al.

[11] 3,759,562
[45] Sept. 18, 1973

[54] CABLE ACTUATOR

[75] Inventors: John D. Keich, Mountain View, Calif.; George A. Laliberte, Hudson, Mass.

[73] Assignee: The United States of America as represented by the Secretary of the Army

[22] Filed: Sept. 12, 1972

[21] Appl. No.: 288,454

[52] U.S. Cl............................... 294/83 A, 244/149
[51] Int. Cl............................................. B64d 17/38
[58] Field of Search................. 294/834 R, 834 AB; 244/149, 150

[56] References Cited
UNITED STATES PATENTS
3,013,834   12/1961   Minicucci .......................... 244/150

Primary Examiner—Evon C. Blunk
Assistant Examiner—James L. Rowland
Attorney—Harry M. Saragovitz et al.

[57] ABSTRACT

A cable actuator for releasing the latch element of a releasable coupling comprising a latch and a link assembly in a parachute extraction system for airdropping heavy loads from aircraft. The cable actuator is normally triggered mechanically as the load exits from the aircraft. The cable actuator of the invention is provided with an electrical solenoid triggering means for use in an emergency situation, such as when the load becomes jammed in the aircraft after deployment of the extraction parachute. The cable actuator is also provided with a manual backup for use in actuating the cable in case of malfunction of the electrical triggering means.

10 Claims, 8 Drawing Figures

3,759,562

PATENTED SEP 18 1973

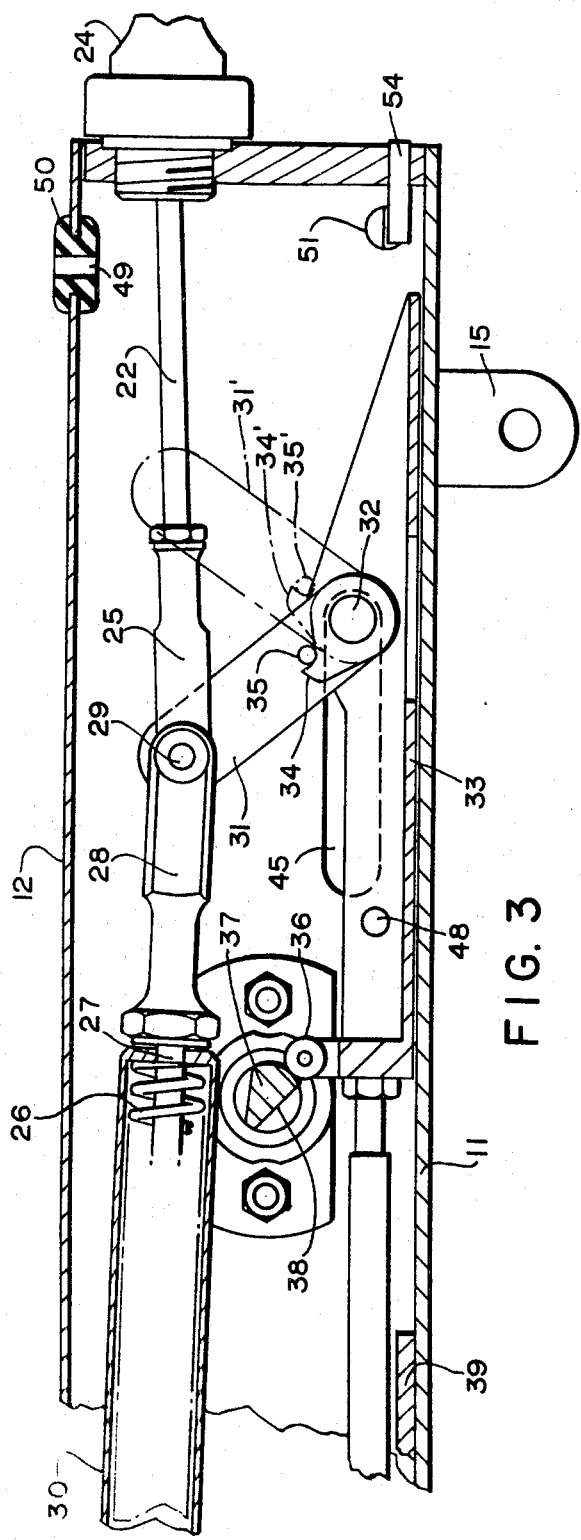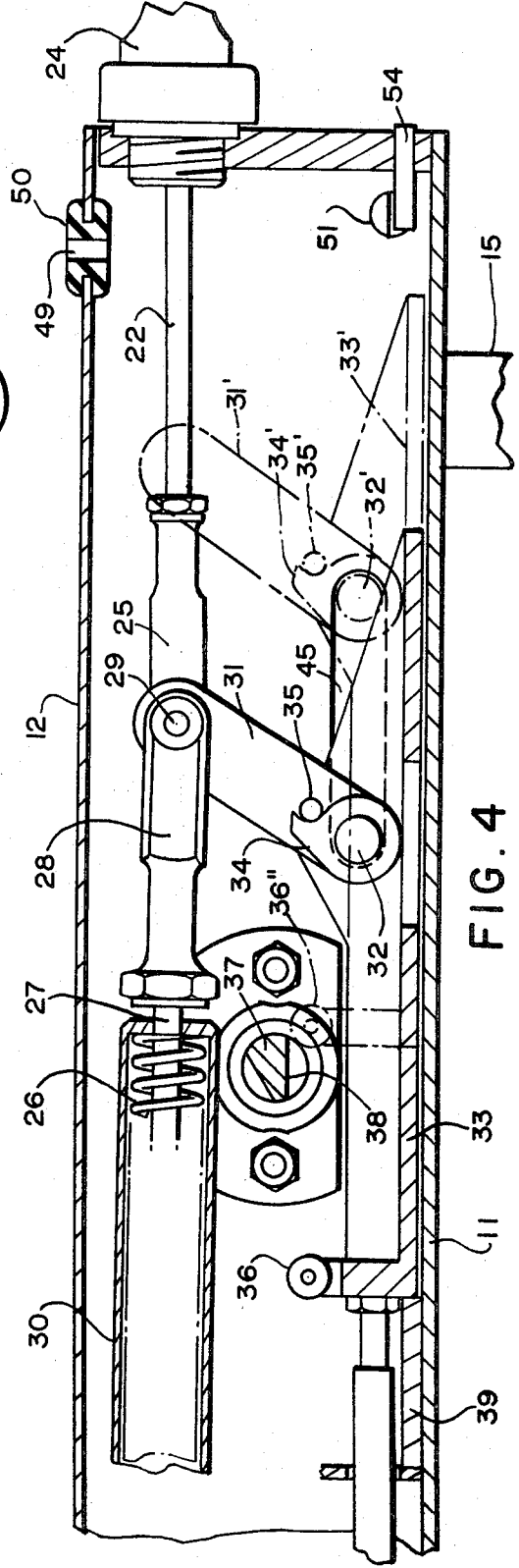

PATENTED SEP 18 1973 3,759,562

CABLE ACTUATOR

The invention described herein may be manufactured, used, and licensed by or for the Government for governmental purposes without the payment to us of any royalty thereon.

This invention relates generally to a cable actuator and more particularly to an emergency release mechanism for releasing a cable actuator from a locked or cocked condition to an unlocked condition whereby a cable is actuated to cause the unlatching of a latch assembly from a link assembly in a releasable coupling of a parachute extraction system used in the airdropping of heavy loads.

The airdropping by parachute of heavy loads of military equipment or supplies has developed to the point where it is now possible to airdrop tanks, heavy trucks, and other heavy equipment from cargo aircraft. To do so requires the provision of means for extraction of the heavy loads of cargo from an aircraft as well as means for safely lowering the extracted load to the ground. The former function is customarily accomplished by deploying an extraction parachute to the rear of an aircraft and utilizing the horizontal force developed by the extraction parachute to pull the heavy load fastened to a platform along a pair of rails leading to a ramp at the rear of the aircraft from which the platform is pulled and thereafter separated from the extraction parachute while a cluster of recovery parachutes is deployed above the load to provide braking action on the descent of the load, the recovery parachute system being designed to minimize damage to the equipment upon impacting the ground. The extraction parachute must be capable of developing very high forces in tension, especially when loads of 50,000 pounds or even more are being airdropped. Extraction forces of one and one-half times the dead weight of the load or even higher forces may be required to initiate extraction of such loads from an aircraft. Thus, if for any reason a platform should become jammed and the extraction parachute should be unable to complete the extraction of such a heavy load from an aircraft, the aircraft, its crew and all other materiel remaining in the aircraft would be in jeopardy without the provision of means for emergency release of the extraction parachute, thus leaving the jammed platform and its load in the aircraft but without the severe strain on the aircraft engine of overcoming the braking action of the extraction parachute.

Equipment has heretofore been developed, as described in Frost et al U. S. Pat. No. 3,425,739, for releasably coupling a load to an extraction parachute and for transferring the extraction force from the load to the deployment of the recovery parachutes at a predetermined time by a tensile pull on a cable which controls a latch connected to a link assembly, which in turn is connected to the extraction parachute. The latch assembly is connected to the load. Thus, when the latch is released by the tensile pull on the release cable, the link assembly along with the extraction parachute separates from the latch assembly and the load. Normally the release cable is pulled by a cable actuator which is mounted on a side rail of the load platform and comprises a trigger arm which rides along the aircraft rails until the load platform leaves the aircraft. Then the trigger arm, which is no longer restrained from rotating by the aircraft rail, rotates and triggers the action of the release cable described above.

It is an object of the invention to provide a cable actuator which is capable of actuating the release cable of a releasable coupling of the type used in extracting loads from aircraft in an airdrop operation in an emergency situation while a load is still in the aircraft and unable to be extracted therefrom by an already inflated extraction parachute, as well as being capable of actuating the release cable in a normal manner, as when the load exits from the aircraft under the pull of the extraction parachute.

It is a further object of the invention to provide both electrical and manual means for accomplishing the emergency actuation of a cable in a releasable coupling, whatever the use to which the releasable coupling may be put.

Other objects and advantages will be apparent from the following description of one embodiment of the invention, and the novel features will be particularly pointed out hereinafter in connection with the appended claims.

Figure 1:
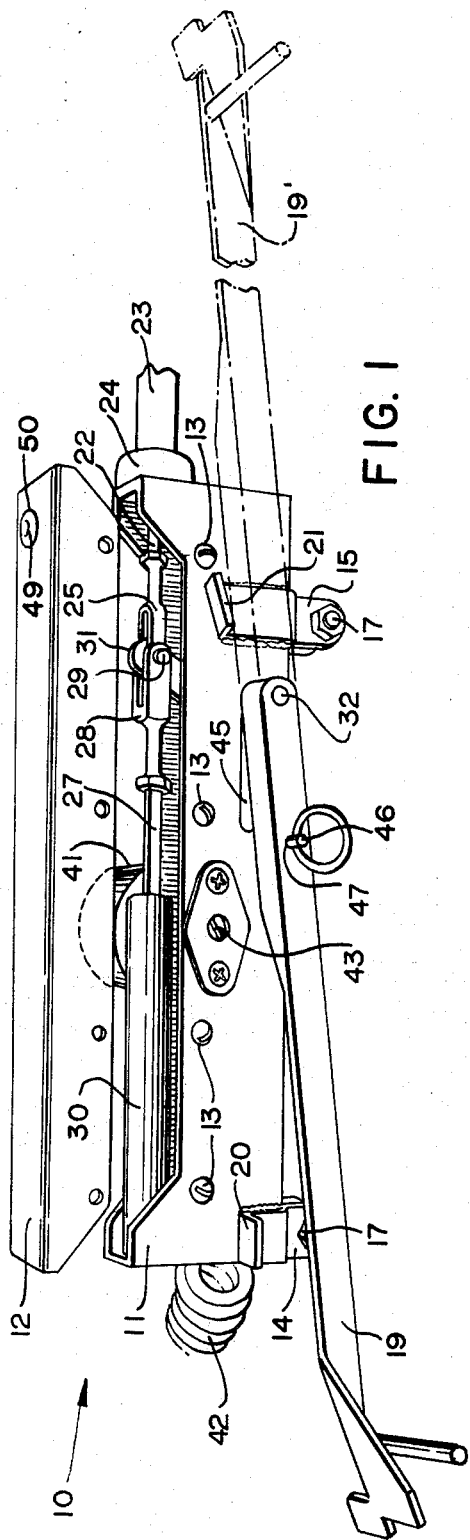
FIG. 1 is a side view in perspective of the cable actuator of the invention with the trigger arm shown in its cocked position and, in phantom, in its uncocked or fired position.
Figure 2:
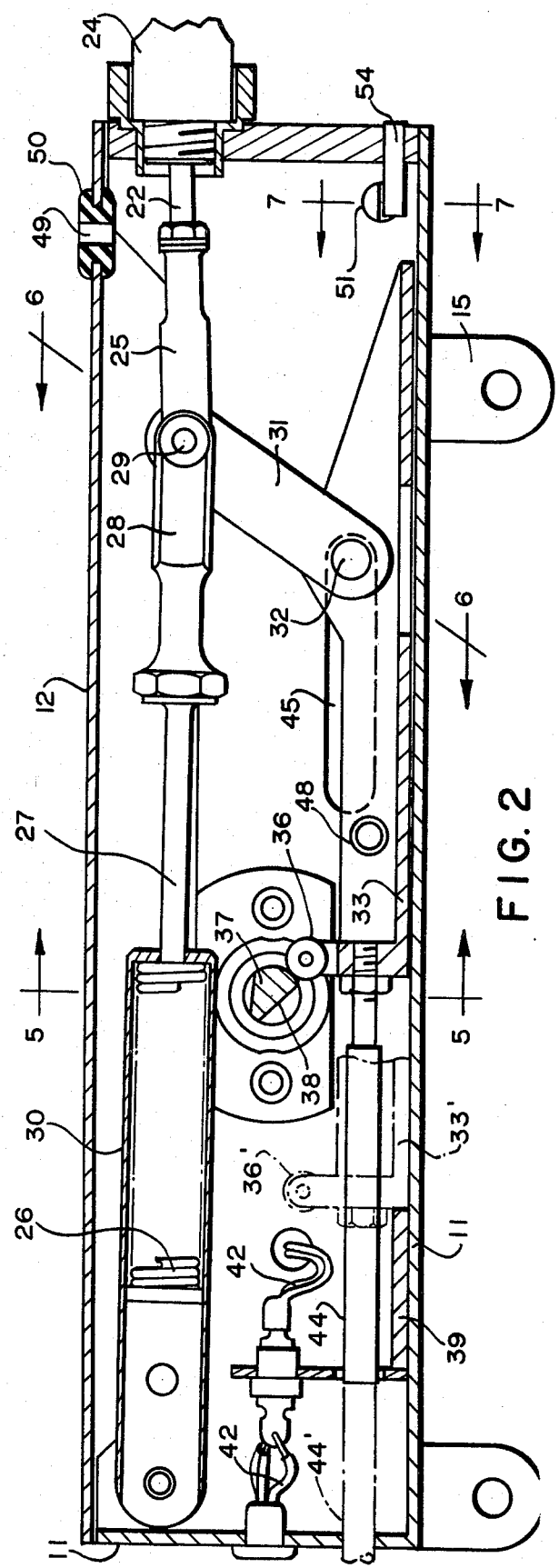
FIG. 2 is a vertical partial sectional view of the cable actuator of FIG. 1 taken through a vertical plane passing through the actuator approximately midway between the sides thereof and through a vertical plane passing through the center of a grommet and hole in the lid, as indicated in FIG. 5.

FIG. 3 is a vertical partial sectional view of the cable actuator similar to that of FIG. 2, but showing the positions of the internal portions of the cable actuator after normal mechanical release has occurred, as when a load platform provided with a cable actuator of the type shown in FIG. 1 has exited from an aircraft and the trigger arm has rotated approximately 180° to its uncocked or fired position as shown in phantom in FIG. 1, the extreme left or forward portion of the cable actuator being broken away.

FIG. 4 is a vertical partial sectional view of the cable actuator similar to that of FIG. 3, but showing the positions of the internal elements of the cable actuator after emergency release either by electrical actuation or manual actuation of the pivotable cam. In this case, the trigger arm remains in its cocked position but slides in a forward direction along the aircraft rail due to the forward translation of the slider and the trigger arm shaft of the cable actuator.

Figure 5:
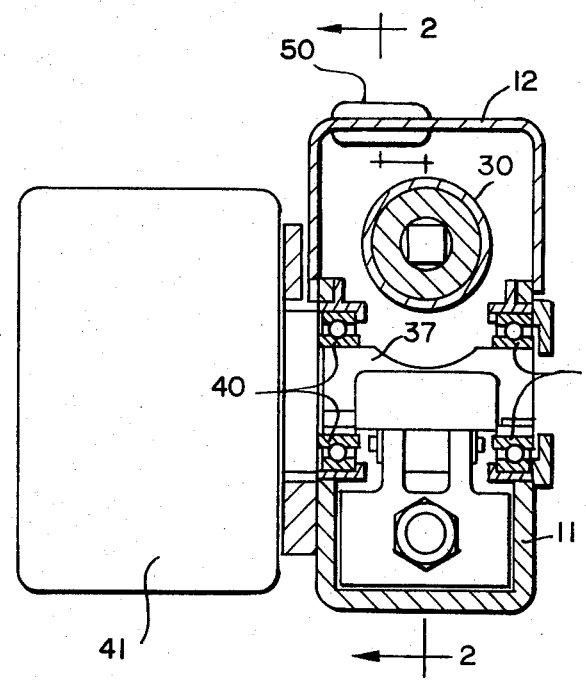

FIG. 5 is a vertical sectional view taken through the plane represented by the line 5—5 in FIG. 2.

Figure 6:
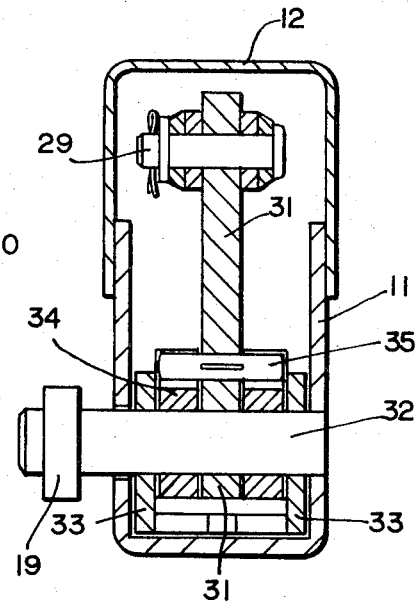

FIG. 6 is a sectional view taken through the plane represented by the line 6—6 in FIG. 2.

Figure 7:
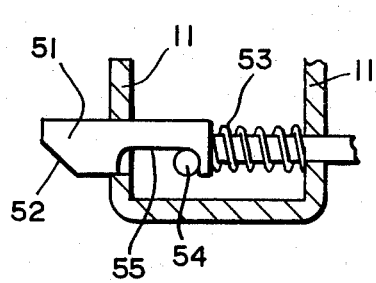

FIG. 7 is a vertical sectional view taken through the plane represented by the line 7—7 in FIG. 2.

Figure 8:
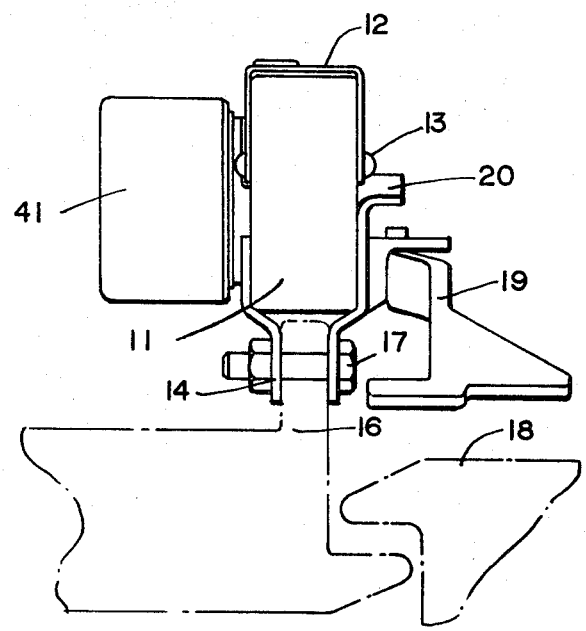

FIG. 8 is a front elevation view of the cable actuator mounted on the side rail of the load platform showing the aircraft rail in relation to the cable actuator and the load platform side rail.

Whenever the term "forward" is used, the intent is to indicate a direction toward the front of an aircraft. Conversely, "rearward" means a direction toward the rear of an aircraft.

In the illustrated embodiment of the invention, the cable actuator generally represented by reference numeral 10 comprises a housing 11 which is substantially rectangular in its outline shape, is hollow, and has a lid 12 which is held in place by screws 13 when in use. The housing is provided with a forward bracket 14 which is attached to the bottom of the housing at the forward end thereof and a rear bracket 15 which is attached to the bottom of the housing near the rear end thereof. The forward bracket has two spaced apart legs which straddle the side rail of the platform on which a cargo load is placed for airdropping. The forward bracket is held clamped to the platform side rail 16 by means of bolt 17. Similarly, the rear bracket has two spaced apart legs which straddle the side rail of the platform and the rear bracket is held clamped to the platform side rail by means of bolt 17. Thus, the cable actuator is held firmly attached to the side rail of the platform and is parallel to and above the aircraft rail 18 on which the trigger arm 19 of the cable actuator rides while the platform is still in the aircraft and the cable actuator is cocked, as in FIGS. 1 and 2. Forward bracket 14 is provided with an overcocking stop 20 which extends out from the side of the housing sufficiently to stop the trigger arm and prevent it from being overcocked during the cocking of the cable actuator, as will be described. Rear bracket 15 is also provided with a stop 21 which extends out from the side of the housing sufficiently to intercept and stop the trigger arm after the release thereof and rotation through approximately 180 degrees, which results in the actuation of cable 22, as will be described.

Cable 22, which may be employed to actuate a latch assembly of a releasable coupling or for other purposes in which the pull of a cable through a short distance is utilized to actuate a mechanical release or other type of mechanism, is conducted into the cable actuator housing by means of cable casing 23, which is connected to the housing by means of coupling 24. It is not deemed necessary to show the details of a releasable coupling or other device which may be actuated by the pull of a cable on a latch or other type of locking device. Such a device is described in Frost et al U. S. Pat. No. 3,425,739. The cable is connected to clevis 25, which connects the cable to the elements of the cable actuator which actuate the cable either under normal conditions of extracting a load from an aircraft or under emergency conditions when a load has become jammed in the aircraft and it becomes necessary to jettison the extraction parachute.

The clevis and the cable are subject to the action of spring 26 acting through plunger 27 and fork 28, which is connected to clevis 25 by pin 29. Spring 26 is housed in cylinder 30. When spring 26 is fully extended forwardly in cylinder 30, the cable 22 is drawn forward into the "fired" position. When spring 26 is fully compressed, as shown in FIG. 2, the cable 22 is translated toward the releasable coupling, generally toward the rear of the aircraft from the cable actuator. Thus, the spring and the cable are in a cocked condition in FIGS. 1 and 2.

Cocking of the spring and the cable from an uncocked or fired condition is accomplished by means of lever 31, which is a flat bar connected at its upper end to pin 29 and at its lower end to trigger arm shaft 32. Trigger arm shaft 32 passes through the side walls of housing 11 as well as the side walls of a slider 33, which has a U-shaped cross-section and varies in height along its length, and which slides from the rear end to the forward end of housing 11 during the emergency release of the cable actuator. Trigger arm shaft 32 extends outside of the housing on the side thereof opposed to the load and platform and is connected to trigger arm 19, preferably by being welded. Trigger arm shaft 32 also passes through the two hooks 34 spaced apart by lever 31, which are held tightly connected in place on shaft 32 by grooved pins (not shown). A pin 35 passes through lever 31, extending far enough beyond the side surfaces of lever 31 on each side thereof to be contacted by hooks 34 when shaft 32 is rotated in a clockwise direction to cock the spring and cable by rotating trigger arm 19 in a clockwise direction.

Slider 33 is provided with a roller 36 mounted on its forward end to serve as a stop for preventing the forward motion of the slider under the influence of the cocked spring until emergency release is to be carried out. Cam 37 is mounted in housing 11 to serve as a stop for the slider by cooperating with roller 36 and as a means for emergency release of the slider. When cam 37 is oriented to the position shown in FIG. 2, it stops the forward motion of roller 36 and slider 33. When turned in a counter-clockwise direction a sufficient amount for the roller to pass by it along its lower flattened surface 38, the cam unlocks the slider and permits the expansion of spring 26 to pull plunger 27 and fork 28 in a forward direction. This action produces a forward pull on clevis 25 and cable 22 and also a forward motion of lever 31 and slider 33 (as shown in FIG. 4) until the slider is stopped by stop 39 mounted on the lower inside surface of housing 11. Cam 37, which is spring-loaded and which rotates in roller bearings 40, is connected to and driven by solenoid 41 in the emergency releasing of the cable actuator.

Solenoid 41 receives an electrical impulse by way of conduit 42, which is connected to a power source in the aircraft (not shown) and a switch (not shown) for emergency actuation of the cable actuator. The end of cam 37 opposite the end connected to the solenoid is provided with a slot 43 into which a screwdriver or a knife or other suitable tool may be inserted for the purpose of turning the cam counter-clockwise and thus manually releasing the cable actuator in the event that emergency release is required and the electrical system has malfunctioned. Additional slots may be formed in tne end of cam 37 if desired to provide for varying thicknesses of the blades of tools to be used for backup release purposes.

The slider is provided with a tongue 44 at its forward end which is substantially completely within housing 11 when the cable actuator is cocked, as shown in FIG. 2, but which extends out of the forward end of housing 11 and is, therefore, visible when the cable actuator has been released in an emergency, as indicated by 44' in FIG. 2.

The outer side wall of housing 11 is provided with a slot 45 in which trigger arm shaft 32 slides in a forward direction when the cable actuator is released in an emergency by electrically or manually turning cam 37 counterclockwise and in a rearward direction when the slider is being pushed rearwardly in the process of cocking the cable actuator following emergency release. When the slider has been pushed as far rearwardly as it will go, cocking of the cable actuator is then completed by rotating trigger arm 19 substantially as far as it will go in a clockwise direction, as described above, hooks 34 acting against pin 35 causing lever 31 to be rotated rearwardly, thus causing spring 26 to be compressed and cable 22 to be translated rearwardly to the extent previously determined as necessary to permit latching of a releasable coupling.

When the trigger arm has been rotated clockwise sufficiently to cock the cable actuator, it may be held in its cocked position by inserting safety locking pin 46 through locking pin hole 47 passing through the trigger arm and through locking pin hole 48 in the side wall of housing 11. When not being used to hold the trigger arm in cocked position, safety locking pin 46 is inserted in hole 49 in the lid 12 of the cable actuator housing for storage purposes. Rubber grommet 50 assists in holding locking pin 46 in place in hole 49 after the load has been made ready for airdropping.

Spring-biased pin 51 is provided in the side wall of housing 11 to serve as a return stop to prevent the trigger arm from rebounding so far from stop 21 after release of the cable actuator as to cause the trigger arm to be in danger of breakage when the platform lands. Pin 51 has a bevelled end 52 over which the trigger arm will slip and push pin 51 back against the biasing action of spring 53. Pin 54 limits the movement of spring-biased pin 51 in either direction in which it moves by means of slot 55 formed in pin 51.

In FIG. 8 trigger arm 19 is seen to be above aircraft rail 18, which is the position in which it is held when locked by locking pin 46 during the placing of a platform supporting a load to be airdropped in an aircraft. When the platform is in place in the aircraft, locking pin 46 is removed, thereby permitting trigger arm 19 to drop down and ride on aircraft rail 18 as the platform moves toward the rear of the aircraft and is extracted therefrom by the pull of the extraction parachute.

In FIG. 1, 19' represents the trigger arm in its uncocked or fired position. In FIG. 2, 33' represents the slider, 36' represents the roller mounted on the slider, and 44' represents the tongue after emergency release has occurred and the slider has moved forwardly and has then been stopped by stop 39. In FIG. 3, 31', 34' and 35', respectively, represent the lever, one of the hooks, and the pin against which the hooks work, when the actuator is in the cocked condition. In FIG. 4, 31', 32', 33', 34', 35' and 36'', respectively, represent the lever, the trigger arm shaft, the slider, one of the hooks, the pin against which the hooks work, and the roller, when the actuator is in the cocked condition.

In the use of the cable actuator of the invention, when a heavy load is to be airdropped from an aircraft, the load is placed on an airdrop platform designed to cooperate with the aircraft rails of a cargo type aircraft and is strapped down so that it will not shift on the platform. A cable actuator, such as that of the invention, is fastened to a side rail of the platform by means of forward and rear brackets 14 and 15 held to the side rail by bolts 17. A release cable of the proper length is connected at one end thereof to the latch of the releasable coupling and at the other end to the cable actuator. The cable actuator is then cocked by pushing the slider rearwardly with the assistance of the trigger arm and trigger arm shaft until roller 36 rolls by cam 37 and the cam snaps back into its locking position under the influence of the spring bias thereon. When this occurs, the trigger arm shaft is substantially at the rear end of slot 45. The trigger arm is now rotated clockwise until safety locking pin 46 can be inserted through locking pin hole 47 in the trigger arm and into locking pin hole 48 in the side wall of housing 11. The loaded platform is now placed in the aircraft on the aircraft rails and the conduit 42 is connected to the source of power and the switch (not shown). The safety locking pin is now removed and placed in hole 49 and the trigger arm is permitted to rotate slightly counterclockwise until the end of the trigger arm rests upon the aircraft rail.

When the proper time arrives for the load to be airdropped, the extraction parachute is deployed to the rear of the aircraft, pulling the releasable coupling with it and pulling the platform along the aircraft rails toward the exit ramp. Under normal conditions of an airdrop, the platform with the load thereon will go out the rear of the aircraft on a ramp and the cable actuator trigger arm will ride off the end of the aircraft rail and immediately thereafter rotate counterclockwise until it strikes stop 21, then drops back and is held by spring-biased pin 51 and prevented from dropping down any farther. At the same time that the trigger arm is rotating counterclockwise as described above, lever 31 is pulled forwardly with a sudden snapping action by the expansion of spring 26 in cylinder 30. It is this sudden snapping action of lever 31 when the trigger arm becomes free to rotate counterclockwise that brings about the rapid counterclockwise rotation of the trigger arm under the influence of the trigger arm shaft to which is imparted a substantial amount of energy from the expanding spring by way of plunger 27, fork 28, pin 29, lever 31, pin 35, and hooks 34. Also, at the same time, the cable is being pulled forwardly with a snapping action by the transmission of energy from the expanding spring through the plunger 27, fork 28, pin 29 and clevis 25 to the cable. The sudden pull on the cable releases the latch in the releasable coupling, thus releasing the three-point link and transferring the extraction force to the deployment line of the recovery parachutes.

If a normal actuation of the cable release becomes impossible because of jamming of the platform and load within the aircraft, no matter what the cause of such jamming may be, it is necessary to take corrective action very quickly when the extraction parachute has been deployed to the rear of the aircraft since it exerts a sizeable resistance to the forward motion of the aircraft if the load does not follow directly behind it as it exits from the aircraft. It is at this point that the importance of the present invention comes into play. In this case, with the cable actuator in its cocked condition as described above, the loadmaster has only to press the switch (not shown) which controls the feeding of electrical power to the solenoid. This power activates the solenoid, which rotates the cam 37 counterclockwise enough to allow the roller 36 to pass by the cam as it rolls in contact with lower flattened surface 38 of the cam. This frees the slider to move forwardly until it is stopped by stop 39. Thus, even though the trigger arm is not free to rotate counterclockwise, as in the above-described normal release situation, because of the aircraft rails on which it continues to rest when the load is jammed, the freedom from restraint of the slider and the lever for movement forwardly permits the spring to expand rapidly, pulling plunger 27, fork 28, pin 29, clevis 25, and cable 22 forwardly, producing the same result as in the normal release, as described above, but by a different procedure. At the same time, lever 31 and slider 33 are moved forwardly as is trigger arm 19, which slides along the aircraft rail in the forward direction until the slider is stopped by stop 39.

In the event that a malfunction occurs in the electrical system in an emergency situation, the loadmaster can still jettison the extraction parachute relatively quickly by inserting a screwdriver or knife blade or other similar device into slot 43 in the end of the cam and manually turning the cam counterclockwise sufficiently to permit the roller to pass by the cam as in the case of solenoid operation of the cam described above. The same sequence occurs as with electrical operation by means of the solenoid.

It is, of course, necessary to provide means in the recovery parachute deployment system for preventing deployment of the recovery parachute when the load is jammed in the aircraft and emergency release of the extraction parachute from the load is carried out in accordance with the invention. This may be accomplished by means of an open link (not shown) in the deployment line between the three-point link and the recovery parachute. Under normal operation of the airdrop system, as described above, the open link is automatically closed by movement of the platform; thus, the recovery parachute can be deployed when the load is out of the aircraft. But in an emergency situation, while the load is still in the aircraft, the open link prevents deployment of the recovery parachute when the extraction parachute together with the three-point link is jettisoned.

Although the invention has been described in terms of the emergency actuation of a cable controlling the release of an extraction parachute from a load being airdropped from an aircraft, the cable actuator of the invention may be employed in the actuation of a cable in any type of equipment involving a sudden pull of a cable a short distance. In fact, the electrical release of the compressed spring by means of a solenoid or the backup manual release by turning a cam with a screwdriver or the like may be used in any equipment requiring a quick pull of considerable force by a cable or plunger to effect release of a latch or other device without use of a trigger arm or with the trigger arm in a cable actuator or a plunger actuator inactivated.

The cable actuator of the invention has the advantage over the prior art cable actuator for use in the airdropping of heavy loads that it provides a means for jettisoning an extraction parachute by the simple expedient of actuating a switch or manually turning a screwdriver or the equivalent rather than the old and hazardous method of cutting the extraction parachute lines while the load is still in the aircraft. It makes a relatively safe operation out of one that heretofore created a serious hazard to the members of an aircraft crew who were engaged in airdropping equipment and supplies.

It will be understood that various changes in the details, materials and arrangements of parts, which have been herein described and illustrated in order to explain the nature of the invention, may be made by those skilled in the art, within the principle and scope of the invention as expressed in the appended claims.

We claim:

1. A cable actuator for actuating a cable means for releasing releasably connected elements of a system under tension load comprising a housing, a compressible coil spring mounted within said housing for storing energy to drive the movable elements of said cable actuator, a slider slidably disposed within said housing, said slider having a rotatable shaft mounted transversely thereof, a rotatable trigger arm connected at one end thereof to one end of said rotatable shaft extending outside of said housing, said trigger arm being adapted to rotate outside of said housing through an arc of about 180 degrees between a cocked position and an uncocked position, a lever pivotally connected at one end thereof to said rotatable shaft so as to pivot about a common axis with the pivot axis of said trigger arm but spaced from said trigger arm inwardly of said housing, a spring-operated plunger, said plunger being movably disposed within said housing and connected at one end thereof to said coil spring and pivotally connected at the other end thereof to the other end of said lever and to said cable, said other end of said lever also being connected to said cable, means for cocking said lever, said plunger, and said coil spring mounted on said rotatable shaft to rotate with said rotatable shaft and having a common pivot axis with the pivot axis of said trigger arm and being actuated by rotation of said trigger arm, a pivotable cam means for locking said slider, and thereby said lever, said plunger, and said coil spring, with said coil spring compressed so as to bias said plunger toward its cable actuating position, said cam means being pivotably mounted within said housing under spring bias to maintain said cam in its locking orientation in the absence of a pivoting force on said cam overcoming said spring bias, means mounted on said slider for cooperating with said pivotable cam means to lock and unlock said slider, and electrical means for causing pivoting of said pivotable cam at a preselected time to unlock said slider, and thereby said lever, said plunger, and said spring, whereby said cable means is actuatable by the movement of said plunger under the force produced by said spring.

2. A cable actuator according to claim 1, wherein said cooperating means for locking and unlocking said slider is a roller stop means mounted on said slider in a position to be stopped by said pivotable cam and to be permitted to pass by said cam when said cam is rotated sufficiently to permit said roller stop means to roll by said cam over a substantially flat surface thereof.

3. A cable actuator according to claim 1, wherein said electrical means for causing pivoting of said pivotable cam is a solenoid.

4. A cable actuator according to claim 1, wherein said pivotable cam means comprises at least one slot in the end thereof opposite the end adjacent to said electrical means for causing pivoting of said pivotable cam, said slot being adapted to receive a tool means for manually pivoting said cam.

5. A cable actuator according to claim 1, wherein said means for cocking said lever, said plunger, and said coil spring comprises at least one hook pivotably mounted on said rotatable shaft and said cocking means is actuated by rotation of said trigger arm.

6. A cable actuator according to claim 5, wherein said housing comprises means for stopping rotation of said trigger arm when said lever, said plunger, and said compressible spring are cocked by rotating said trigger arm and thereby said hook.

7. A cable actuator according to claim 6, wherein said housing comprises means for stopping counterclockwise rotation of said trigger arm after said trigger arm is released from its cocked position and rotates sufficiently to permit said lever to rotate forwardly under the influence of said spring, thereby causing actuation of said cable.

8. A cable actuator according to claim 7, wherein said housing comprises a spring biased stop means for stopping reverse rotation of said trigger arm after being stopped by said means for stopping counterclockwise rotation of said trigger arm when said trigger arm is released from its cocked position and rotates counterclockwise sufficiently to permit said lever to rotate forwardly.

9. A cable actuator according to claim 5, wherein said cable actuator comprises a removable locking pin for locking said trigger arm in its cocked position.

10. A cable actuator according to claim 9, wherein said housing comprises stop means for stopping the movement of said slider when said slider, and thereby said lever, said plunger, and said spring, are unlocked and said cable is actuated to the extent desired, and said slider comprises means for visually indicating outside of said housing that said slider has moved forwardly due to emergency release of said cable actuator.

* * * * *